(12) United States Patent
Kumar et al.

(10) Patent No.: US 8,245,291 B2
(45) Date of Patent: Aug. 14, 2012

(54) TECHNIQUES FOR ENFORCING ACCESS RIGHTS DURING DIRECTORY ACCESS

(75) Inventors: Girish Kumar, Bangalore (IN); Pradeep Kumar Rathi, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 939 days.

(21) Appl. No.: 12/272,981

(22) Filed: Nov. 18, 2008

(65) Prior Publication Data

US 2010/0125893 A1    May 20, 2010

(51) Int. Cl.
*H04L 29/06* (2006.01)
(52) U.S. Cl. ............................. 726/17; 726/6
(58) Field of Classification Search ............ 726/17, 726/6
See application file for complete search history.

(56) References Cited

U.S. PATENT DOCUMENTS

| | | | |
|---|---|---|---|
| 5,878,415 A * | 3/1999 | Olds | 1/1 |
| 6,308,181 B1 * | 10/2001 | Jarvis | 707/786 |
| 6,973,545 B2 | 12/2005 | Cypher | |
| 7,185,047 B1 * | 2/2007 | Bate et al. | 709/202 |
| 7,203,709 B2 | 4/2007 | Long et al. | |
| 7,631,160 B2 * | 12/2009 | Strongin et al. | 711/163 |
| 7,895,639 B2 * | 2/2011 | Spataro et al. | 726/2 |
| 2002/0124082 A1 * | 9/2002 | San Andres et al. | 709/225 |
| 2003/0131246 A1 * | 7/2003 | Reeves et al. | 713/182 |
| 2005/0216469 A1 * | 9/2005 | Saito | 707/9 |
| 2007/0050368 A1 * | 3/2007 | Watanabe | 707/9 |
| 2007/0168528 A1 * | 7/2007 | Taniguchi et al. | 709/229 |

OTHER PUBLICATIONS

"IBM Tivoli Directory Server tuning", http://bublib.boulder.ibm.com/infocenter/tivihelp/v2r1/index.jsb?topic=/com.ibm.IBMDS.doc/tuning05.htm, Directory Server, Version 6.1, (Downloaded Sep. 15, 2008).

* cited by examiner

*Primary Examiner* — Michael Pyzocha
(74) *Attorney, Agent, or Firm* — Kilpatrick Townsend & Stockton LLP

(57) ABSTRACT

Techniques for enforcing access rights during directory access are presented. Access rights are maintained at the container level of a directory tree for container objects within a cache. When security is set for a requester of a target, the container object cache is directly accessed along with rights assigned to the target and the security is calculated and then set against the requester.

23 Claims, 3 Drawing Sheets

TECHNIQUES FOR ENFORCING ACCESS RIGHTS DURING DIRECTORY ACCESS

BACKGROUND

With the omnipresence of the Internet and broadband technology, enterprises can have employees, customers, and assets distributed across the entire globe. In addition, the employees, customers, and assets access data or information of the enterprises via enterprise-defined directories, which are accessible throughout a logical and global enterprise network.

To ensure proper security access for each employ, customer, or asset that attempts to connect to the enterprise network and appropriate information in the directories, a variety of Access Control Lists (ACLs) are often deployed.

Conventional directory deployment scenarios have far too many Access Control List (ACL) attribute values that are defined on container objects within the directory. For example, a Role-Based Access Control (RBAC) configuration can have approximately 300 ACL attribute values that are populated on a single directory container. Evaluating these access rights entails initially reading the ACL attributes from a tree root until a desired target entry is reached.

Based on an authenticated identity for a requesting user (employee or customer) or asset (automated program attempting to access the directory) there are often security equivalent list, which are generated. An access rights buffer holds the actual rights on a target directory entry based on: a security equivalence vector (SEV) list, entry rights, all attribute rights and specific attribute rights. In a typical search operation, one has to create a rights buffer for every entry which matches the search filter, which is being used. Access evaluation is done in two-passes. The first pass determines that an authenticated identity has browse rights on the directory entry, and compares rights on the search filter predicates. The second pass determines if the authenticated identity has read rights on attributes that are being requested from a search attribute list. ACLs are read (from a partition root to the target entry) and then converted into a rights buffer for every target entry (based on the SEV list and the requested attributes).

In a specific customer scenario, with 18K objects below a container object of a directory and 300 ACL attributes on the container (and which is not unusual), a sub tree search on the container alone can take 17 seconds (as it has to read 5.4 million plus ACLs and create Rights buffers along the way).

In an era where results and access are expected nearly instantaneously 17 seconds can seem like an eternity and can substantial erode customer usability and correspondingly and enterprise's business reputation. Furthermore, the processing time can and often will be much longer in many other scenarios for larger directory installations associated with larger enterprises. So, the problem can be heightened to a point where customers leave and enterprise and seek directory and/or information services elsewhere.

Thus, it is advantageous to provide improved techniques for enforcing access rights during directory access are desirable.

SUMMARY

In various embodiments, techniques for enforcing access rights during directory access are provided. More particularly and in an embodiment, a method is provided to enforce directory access rights during a directory access. Specifically, access rights for a trustee are collected from a root to a container of a directory. Next, a rights buffer is generated for the trustee that includes the access rights. Finally, the rights buffer is cached for access from cache when setting security access for the trustee when the trustee accesses a target resource or attribute of the target resource. The target resource or the attribute is included within the container of the directory.

DETAILED DESCRIPTION

A "resource" or "directory resource" represents entities of a directory, such as but not limited to, representations for users, files, groups, directories, devices, programs, services, geographical locations, storage locations, containers (logical groupings) of these things, etc. Sometimes the resources or entities may be referred to as "directory objects." The objects are organized hierarchically, such as in a tree structure. Each node of the tree represents an entry for a particular object. Each entry includes a set of attributes. An attribute includes a name, such an attribute type or description, and one or more values. The attributes collectively may be defined in a schema. Each object entry also includes a unique identifier referred to as its Distinguished Name (DN), which includes a full path of a current object from its topmost parent in the tree to its tree entry within the directory.

A "principal" is a special type of resource that includes an identity. Some example principal's include users or automated services. A principal authenticates via identity and authentication services of an enterprise to acquire an identity, which represents an electronic identifier that uniquely identifies the principal within a particular context, such as a distributed directory system.

Furthermore, as used herein a "trustee" may be used synonymously and interchangeably with "principal."

In some embodiments, a distributed directory system is used having a plurality of distributed services. Each distributed service operates within a different environment over a wide area network (WAN), such as the Internet or such as multiple directory replicas connected using a private Local Area Network (LAN). Each environment includes a replica or set of defined resources of the directory. In this manner, each directory service is capable of providing a particular directory resource to a requestor from its own managed environment.

A "request" may be any directory service operation being made by one resource, such as a user, client or automated program, with respect to another resource, such as a server, program, device, etc.

According to an embodiment, the techniques for enforcing access rights during directory access as described herein and below are implemented as an enhancement within or as a part of eDirectory®, which is distributed by Novell, Inc. of Provo, Utah.

Of course it is to be understood that any network architecture, device, proxy architecture, operating system (OS), directory service, proxy, or product may be enhanced to utilize and deploy the techniques presented herein and below.

It is within this initial context embodiments of the invention are now discussed with reference to the FIGS. 1-4.

Figure 1:
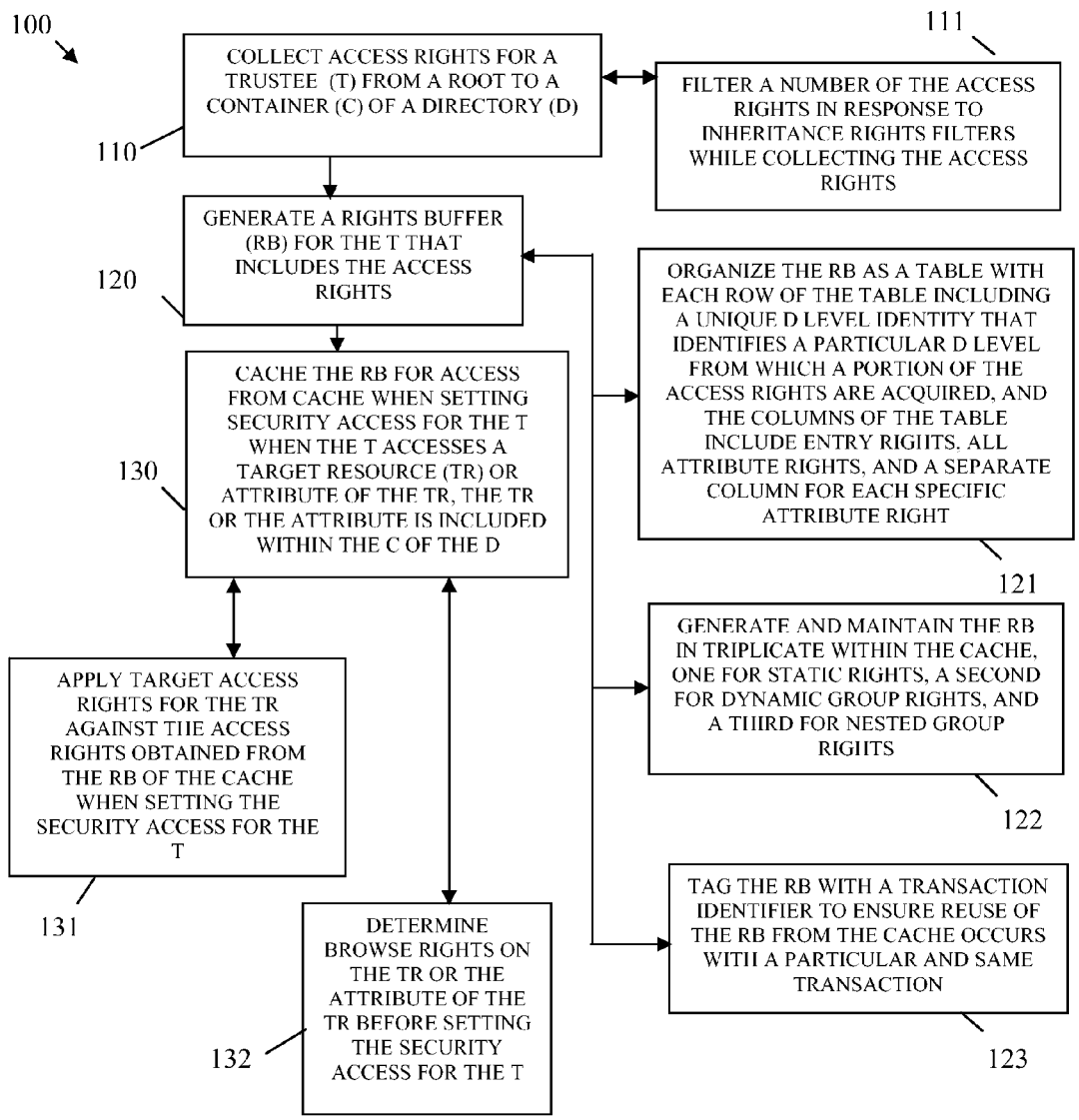
FIG. 1 is a diagram of a method for enforcing directory access rights during a directory access, according to an example embodiment.

FIG. 1 is a diagram of a method 100 for enforcing directory access rights during a directory access, according to an example embodiment. The method 100 (hereinafter "directory security enforcement service") is implemented in a machine-accessible and computer-readable storage medium as instructions that process on a machine (computer or processor-enabled device). The directory security enforcement service is also operational and accessible over a network. The network may be wired, wireless, or a combination of wired and wireless. In an embodiment, the network is a WAN, such as the Internet. In another embodiment, the network is a local area network (LAN). In still another case, the network is a combination of a LAN and a WAN.

At 110, the directory security enforcement service collects access rights for a trustee (principal) from a root to a container of a directory. The directory is organized hierarchically from a root to leaf nodes that represent specific resources within the directory. It is noted that non-leaf nodes of the directory tree can in and of themselves be resources via logical groupings and container object associations. A container-object is a non-leaf node of the directory and usually one level above a leaf node within the directory tree.

So, the directory security enforcement service traverses the directory and inspects each node (object) for access control lists (ACL's) that define access rights on each node of the directory tree.

The path from the root to the container object, within the directory tree includes a variety of ACL's. Some of these ACL's can override other ACL's. So, suppose a path to a container level is X-Y-Z, where Z is the container object level. X includes access rights A1 and B1, whereas Y includes access rights A2 and C1. Here, the access rights of A1 are overridden by the access rights A2 at level Y, such that before access rights at the container level Y are applied the access rights are A2, B1, and C1.

So, according to an embodiment, at 111, the directory security enforcement service is capable of filtering a number of the access rights in response to inheritance rights filter while collecting the access rights.

At 120, the directory security enforcement service generates a rights buffer for the trustee that includes the access rights.

In an embodiment, at 121, the directory security enforcement service as a table with each row of the table including a unique directory level identity that identifies a particular directory level from which a portion of the access rights are acquired. The column of the table includes entry rights, all attribute rights, and a separate column for each specific attribute right.

In another case, at 122, the directory security enforcement service generates and maintains the rights buffer in triplicate within the cache (discussed below): one for static rights that are not changed regularly, a second for dynamic group rights, and a third for nested group rights.

In yet another situation, at 123, the directory security enforcement service tags the rights buffer with a transaction identifier to ensure that when reuse from the rights buffer occurs, the reuse occurs with a particular and same transaction of the directory.

At 130, the directory security enforcement service caches the rights buffer for access from cache when setting security access for the trustee when the trustee access a target resource or one or more attributes of the target resource. The target resource or attribute of the target resource is included within or falls below the container within the directory tree. So, the container includes the target resource of the target attribute.

During application, at 131, the directory security enforcement service applies target access rights for the target resource or the target attribute against the access rights obtained from the rights buffer of the cache. This is done when setting security access for the trustee.

So, application of ACL's within a directory tree does not entail searching the entire directory tree each time a trustee desires access to a particular target resource or attribute of a target resource. The rights buffer includes the proper access rights (including any inheritance and filters) for a container that the trustee is entitled to. Moreover, the rights buffer is in cache and immediately accessible to the directory security enforcement service, such that a directory search on access is not needed (at least not for searches occurring after the first search that builds the rights buffer in cache). The access rights of the rights buffer are then applied against the target resources access rights or target attributes of those target access rights to set the security for the trustee.

Thus, in an embodiment, at 132, the directory security enforcement service determines browser rights on the target resource or the target attribute of the target resource before setting the security access for the trustee.

A detailed example of the rights buffer and its usage in a particular example implementation is now presented for purposes of illustration and comprehension.

In an embodiment, the ACL is a multi-valued attribute that holds access control information. The example ACL syntax is as follows:

Privilege # Scope # TrusteeName # AttrName

The Trustee (subject) is the resource who gets rights; the target is the directory resource on which the right applies. The ACLs are placed on the target object or resource.

The Privilege is a bit mask for:

(a) Entry rights, which control what a trustee can do to the target object/resource; and (b) Attribute rights control what a trustee can do to the attributes of the target object/resource.

The Scope can be defined as either "entry" or "sub tree". The sub tree scope allows for subordinate objects to inherit the trustee assignment.

The TrusteeName can be a Distinguished Name (DN) or a special identity for a resource.

The AttrName is defines as a: specific attribute name, all attribute rights, or entry rights.

An Inheritance Rights Filter is a specific type of ACL, which blocks rights from flowing down the directory tree.

"Security Equivalence" refers to a mechanism for acquiring the same rights as another object within the directory tree. So, if object A is added as a security equivalent (SEV) to object B, the rights of object B are added to object A while calculating A's effective rights. Note: that the SEV is effective only for one step. There are three types of security equivalence:

(a) Explicit: by assignment;

(b) Automatic: by membership in a group or role; and (c) Implied: equivalent to all parent containers and a Public Trustee.

For effective rights calculation, trustees are the users/identities whom are trying to access the resource (target) along with its SEV's. A Rights Buffer is a combination of following arrays based on SEV identifier list:

(a) Entry Rights;

(b) All Attribute Rights; and (c) Security equivalent entry identifier (an entry that is security equivalent to a subject authenticated identity).

For each trustee in a list to process, the rights evaluation starts from the tree root until it reaches the target object. Inheritable rights on the tree root are used as initial rights.

For each level in the hierarchy, based on an Inheritance Rights Filter, rights are removed and any current level inheritable rights are used to override higher level inheritable rights. This step is repeated at each level including at the target object/resource level. Next, any non inheritable rights assigned at the target, are overridden as needed.

In an embodiment, inherited ACLs are cached on the partition root entry. So, instead of starting from the tree root, processing can start from a partition root. A background process (such as a janitor) takes care of updating inherited ACLs on the partition root.

The directory security enforcement service caches the rights buffer at the container level and excludes the target object. Primarily, caching occurs until the container layer is reached; as most ACLs are stored on non-leaf objects. Using this approach, a set of container level caches is maintained on a connection that depends on the target objects being evaluated. In a specific case associated with a directory sub tree search, the ACLs are accessed just once for a container, even if a total of 18K or more objects are returned from a particular container.

An example Rights Buffer is organized as the following table:

| seid 1 | Entry Rights | All Attribute Rights | Attribute A | Attribute B . . . |
|---|---|---|---|---|
| seid2 | | | | |
| seid3 | | | | |
| seid4 | | | | |
| seid5 | | | | |
| seid6 . . . | | | | |

The rights buffer is cached as a function of SEIDs and the requested attributes from the trustee. For a same directory search, multiple rights calculation calls are made with different attribute lists. The initial evaluation starts by resolving browse rights on trustee entry and then comparing rights for search filter predicates. Later when a matching entry is returned, a search request attribute list determines which attributes to evaluate for rights.

Due to dynamic groups and nested groups that can occur within a distributed directory, three rights buffers may be maintained for each container object:

Static Rights Buffer;
Dynamic Group Rights Buffer; and
Nested Group Rights Buffer.

The dynamic group and nested group rights buffer are used only if static rights do not satisfy desired rights.

After computing the rights buffer to the container level, the buffers are serialized for later reuse in Search operation.

Serialized buffers are tagged with a current transaction identifier and are reused only if the transaction identifier is the same. This ensures that entry updates did not modify SEVs or ACLs.

Based on the lineage of container objects, identity-based (trustee or principal identity) specific rights buffer cache is created for non-leaf objects and reused to improve access control evaluation. Only the ACL's on the target entry needs evaluation; thus, making the evaluation time independent of the number of ACLs stored on non-leaf objects in a directory tree.

Therefore significant performance improvements occur in a variety of situations, such as these scenarios:

higher directory tree depth;
more ACL's on container objects; and
static authorization of data.

Essentially, the process of rights buffer creation is split such that a rights buffer is created for each container object of the directory tree container and then reused for an authenticated identity (trustee or principal) across multiple transactions. Reusing a cached container-specific rights buffer drastically reduces the time taken in directory-based ACL computations. Furthermore, sub tree searches are significantly improved for directory services.

Figure 2:
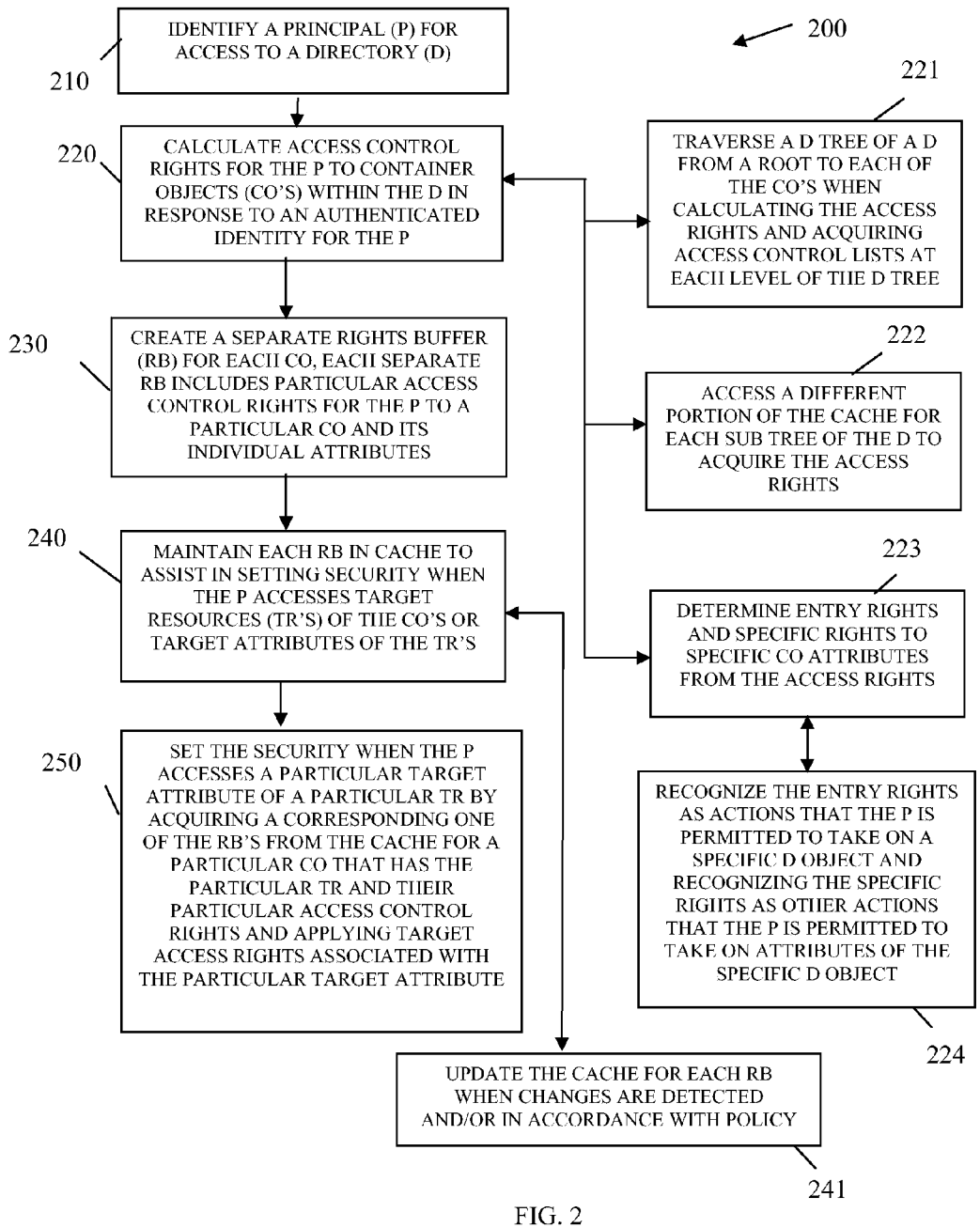
FIG. 2 is a diagram of another method for enforcing directory access rights during a directory access, according to an example embodiment.

FIG. 2 is a diagram of another method 200 for enforcing directory access rights during a directory access, according to an example embodiment. The method 200 (hereinafter "directory access control service") is implemented in a machine-accessible and computer-readable storage medium as instructions that process on a machine (computer or processor-enabled device). The directory access control service is also accessible and operational over a network. The network may be wired, wireless, or a combination of wired and wireless. The network can also be organized as a WAN, LAN, or a combination of both a WAN and a LAN.

The directory access control service presents another and in some cases enhanced perspective to the directory security enforcement service represented by the method 100 of the FIG. 1.

At 210, the directory access control service identifies a principal for access to a directory. The principal is authenticated for access to the directory as a particular principal identity. In an embodiment, an identity service supplies a principal identity for the principal to use when interacting with the directory access control service.

At 220, the directory access control service calculates access control rights for the principal to container objects within the directory. This is done via the authenticated identity assigned to the principal.

According to an embodiment, at 221, the directory access control service traverses a directory tree of a directory from a root to each container object (non-leaf node of the directory tree) when calculating the access rights. Also, ACLs are acquired at each level of the directory tree along the way or in the process.

In an alternative approach, at 222, the directory access control service accesses a different portion of the cache for each sub tree or partition of the directory to acquire the access rights. Here, the portioned roots of the directory have cached ACLs that can be accessed directly from a portion of the cache. This can be used to substantially improve the initial creation of the rights buffer (discussed below).

In a particular case, at 223, the directory access control service determines entry rights and specific attribute-based rights for container object attributes from the access rights that are being calculated.

Continuing with the embodiment of 223 and at 224, the directory access control service recognizes the entry rights as actions that the principal is permitted to take on a specific directory object. The specific rights are also identified as other actions that the principal is permitted to take on attributes of the specific directory object.

At 230, the directory access control service creates a separate rights buffer for each container object. Each rights buffer includes specific access control rights that the principal can take on a particular container object and its attributes.

At 240, the directory access control service maintains each rights buffer in cache to assist in setting security when the principal accesses target resources or target attributes that are included within the container objects. So, when the principal attempts to access a specific target or attribute of a target the rights calculation is initially acquired by identifying the container for that target and accessing the corresponding rights buffer in cache with the desired attributes that the principal wants to access.

As was discussed above with respect to the FIG. 1 and the implementation illustration and again at 241, the directory access control service can update the cache for each rights buffer (much like updates to the portioned roots that may be cached) when changes or detected and/or in accordance with policy.

In an embodiment, at 250, the directory access control service sets security for requesting principal by acquiring the access rights of the container for the desired target resource or attribute. Next, any specific access rights set on the target resource or attribute are used to modify the access rights returned from the container. In this manner, the setting of security for a principal's interaction with a specific directory resource or attribute of a resource can be achieved in a two-step process, once the rights buffer was initially created and cached. This is a substantial improvement over what has been available with conventional directory services.

Figure 3:
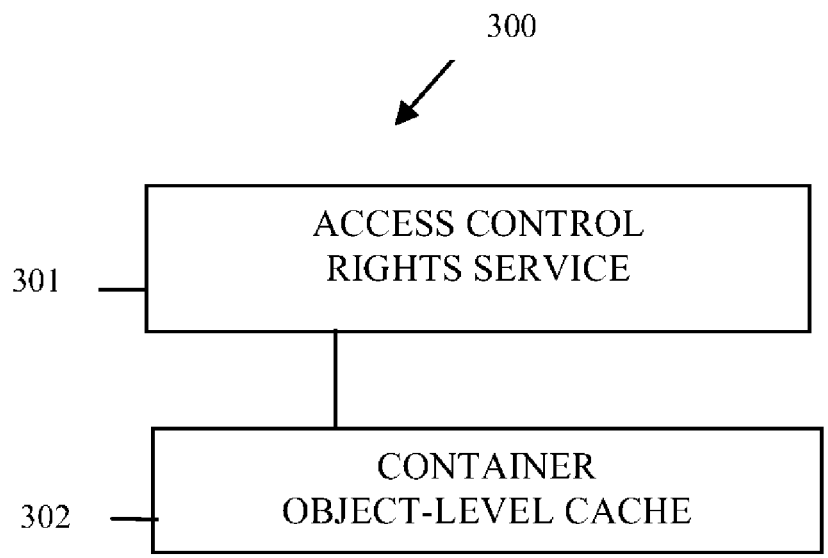
FIG. 3 is a diagram of a directory access rights system, according to an example embodiment.

FIG. 3 is a diagram of a directory access rights system 300, according to an example embodiment. The directory access rights system 300 is implemented in a machine-accessible and computer-readable storage medium as instructions that process on one or more machines (computer(s) or processor-enabled device(s) of a network. accessible over a network. The network may be wired, wireless, or a combination of wired and wireless. In addition the network can be organized as a WAN, LAN, or a combination of a WAN and a LAN.

In an embodiment, the directory access rights system 300 implements, among other things, various aspects of the methods 100 and 200 of the FIGS. 1 and 2, respectively.

The directory access rights system 300 includes an access control rights service 301 and a container-object level cache 302. Each of these and their interactions with one another will now be discussed in turn.

The access control rights service 301 is implemented in a computer-readable storage medium as instructions that process on a machine (computer or processor-enabled device) over a network. The network can be wired, wireless, or a combination of wired and wireless. Example processing associated with the access control rights service 301 was presented above in detail with reference to the methods 100 and 200 of the FIGS. 1 and 2, respectively.

The access control rights service 301 creates the container-object level cache 302 for a container of a directory. The access control rights service 301 traverses a directory tree, which logically represents the directory, from a root to a level associated with a container object and collects access rights along the way. In a different case, the access control rights service 301 accesses a partitioned sub tree or partitioned root for the container object from cache to acquire the access rights. This is another optimization that can occur, where ACLs are cached for the partitioned roots and the access control rights service 301 collects these before creating the container-object cache 302.

According to an embodiment, the access control rights service 301 also applies rights filters when traversing the directory tree to create the container-object cache 302. So, at each level of tree traversal various policies and filters can be applied to modify the access rights that are being collected for the container object.

The container-object cache 302 is implemented in a computer-readable storage medium and is accessible to, created by, and managed by the access control rights service 301.

The container-object cache 302 is specific to the container object and includes access rights for that container object within the directory tree for the directory with respect to a particular requesting principal. This is done via an authenticated identity associated with the requesting principal. So, when an authenticated principal attempts to access a target resource or a target attribute of the target resource, the access control rights service 301 sets security based on target access rights associated with the target resource or attribute, entries for the access rights in the container-object cache 302, and the identity for the principal.

In an embodiment, the container-object level cache 302 is maintained as a table. Each row of the table corresponds to a particular level in a path from a root to the container object and each column corresponding to a different type of access right. This was described in detail above with reference to the illustrative implementation example presented at the end of the discussion of the method 100 for the FIG. 1.

In another scenario, the container-object level cache 302 is regularly updated in accordance with policy. So, policy may dictate when the container-object level cache 302 is deemed stale and flushed or updated.

Figure 4:
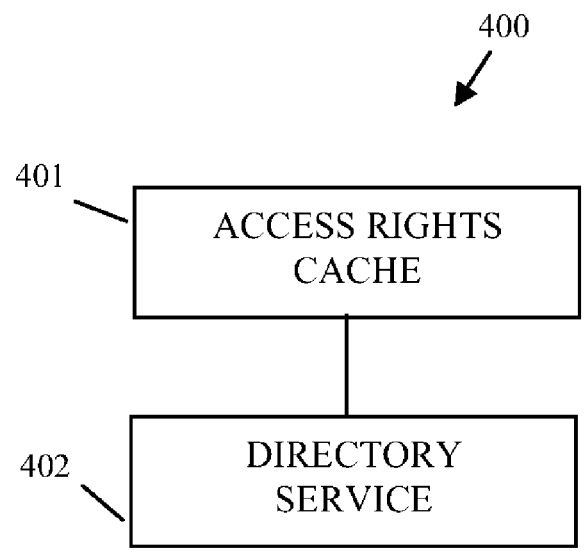
FIG. 4 is a diagram of another directory access rights system, according to an example embodiment.

FIG. 4 is a diagram of another directory access rights system 400, according to an example embodiment. The directory access rights system 400 is implemented in a machine-accessible and computer-readable storage medium as instructions that process on one or more network machines (computer(s) or processor-enabled device(s). The network may be wired, wireless, or a combination of wired and wireless. Moreover, the network may be organized as a WAN, LAN, or a combination of both a WAN and LAN.

In an embodiment, the directory access rights system 400 implements various aspects associated with the methods 100 and 200 of the FIGS. 1 and 2, respectively, and the system 300 of the FIG. 3.

The directory access rights system 400 includes an access rights cache 401 and a directory service 402. Each of these and their interactions with one another will now be discussed in detail.

The access rights cache 401 is maintained for a plurality of container objects of a directory tree.

According to an embodiment, the access rights cache 401 is maintained or implemented within memory, on disk storage, or in both memory and storage.

In another case, the access rights cache 401 is updated in accordance with one or more configured and enforced policies.

The directory service 402 is implemented in a computer-readable storage medium as instructions that process on one or more machines (computer(s) or processor-enabled device (s)) of a network. The network may be wired, wireless, or a combination of wired and wireless. Example processing associated with the directory service 402 was presented above with reference to the methods 100 and 200 of the FIGS. 1 and 2, respectively, and with respect to the system 300 of the FIG. 3.

In an embodiment, the directory service 402 is an enhanced version of eDirectory® distributed by Novell, Inc. of Provo, Utah. Of course it is to be understood that any existing or new directory service can be enhanced to achieve the functionality described herein to become the directory service 402.

The directory service 402 maintains a collection of container-level rights buffers within the access rights cache 401. Each rights buffer corresponds to access rights for a particular principal on a particular container object. So, when a particular principal attempts to access a target resource or a target attribute of the target resource (and which is included within the particular container object), the directory service 402 uses a corresponding container-level rights buffer and its access rights along with other access rights of the target resource to calculate and set security for the particular principal on the target resource or target attribute.

According to an embodiment, the directory service 402 overrides some rights in response to rights filters that are applied at each level of the directory tree for the directory when traversing to the container object and its level within the directory tree.

In another case, the directory service 402 maintains each container-level rights buffer in triplicate as a static rights buffer, a dynamic rights buffer, and a nested groups rights buffer.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    collecting, by a computer system, access rights for a trustee from a root to a container of a directory;
    generating, by the computer system, a rights buffer for the trustee that includes the access rights, wherein generating includes generating and maintaining the rights buffer in triplicate within a cache, a first buffer of the triplicate for static rights, a second buffer of the triplicate for dynamic group rights, and a third buffer of the triplicate for nested group rights; and
    caching, by the computer system, the rights buffer for access from the cache when setting security access for the trustee when the trustee accesses a target resource or attribute of the target resource, wherein the target resource or the attribute is included within the container of the directory.

2. The method of claim 1, wherein collecting further includes filtering a number of the access rights in response to inheritance rights filters while collecting the access rights.

3. The method of claim 1, wherein generating further includes organizing the rights buffer as a table with each row of the table including a unique directory level identity that identifies a particular directory level from which a portion of the access rights are acquired, and wherein the columns of the table include entry rights, all attribute rights, and a separate column for each specific attribute right.

4. The method of claim 1, wherein generating further includes tagging the rights buffer with a transaction identifier to ensure reuse of the rights buffer from the cache occurs with a particular and same transaction.

5. The method of claim 1, wherein caching further includes applying target access rights for the target resource against the access rights obtained from the rights buffer of the cache when setting the security access for the trustee.

6. The method of claim 1, wherein caching further includes determining browse rights on the target resource or the attribute of the target resource before setting the security access for the trustee.

7. A method, comprising:
    identifying, by a computer system, a principal for access to a directory;
    calculating, by the computer system, access control rights for the principal to container objects within the directory in response to an authenticated identity for the principal;
    creating, by the computer system, a separate rights buffer for each container object, wherein each separate rights buffer includes particular access control rights for the principal to a particular container object and its individual attributes; and
    maintaining, by the computer system, each rights buffer in cache in triplicate to assist in setting security when the principal accesses target resources of the containers objects or target attributes of the target resources, wherein a first buffer of the triplicate includes static rights, a second buffer of the triplicate includes dynamic group rights, and a third buffer of the triplicate includes nested group rights.

8. The method of claim 7 further comprising, setting, by the computer system, the security when the principal accesses a particular target attribute of a particular target resource by acquiring a corresponding one of the rights buffers from the cache for a particular container object that has the particular target resource and their particular access control rights and applying target access rights associated with the particular target attribute.

9. The method of claim 7, wherein calculating further includes traversing a directory tree of a directory from a root to each of the container objects when calculating the access rights and acquiring access control lists at each level of the directory tree.

10. The method of claim 7, wherein calculating further includes accessing a different portion of the cache for each sub tree of the directory to acquire the access rights.

11. The method of claim 7, wherein calculating further includes determining entry rights and specific rights to specific container object attributes from the access rights.

12. The method of claim 11 further comprising, recognizing, by the computer system, the entry rights as actions that the principal is permitted to take on a specific directory object and recognizing the specific rights as other actions that the principal is permitted to take on attributes of the specific directory object.

13. The method of claim 7, wherein maintaining further includes updating the cache for each rights buffer when changes are detected and/or in accordance with policy.

14. A system, comprising:
    a processor; and
    a memory coupled with and readable by the processor and having stored therein a sequence of instructions which, when executed by the processor, cause the processor to execute a access control rights service and a container-object level cache accessible to and managed by the access control rights service, wherein the access control rights service creates in triplicate a separate rights buffer in the container-object level cache for a container object of a directory and includes access rights for that container object within a directory tree for the directory with respect to a particular principal via an identity associated with that particular principal, wherein a first buffer of the triplicate includes static rights, a second buffer of the triplicate includes dynamic group rights, and a third buffer of the triplicate includes nested group rights, and wherein when the particular principal attempts to access a target resource or a target attribute of the target resource, the access control rights service sets security based on target access rights associated with the target resource or the target attribute, entries in the container-object level cache, and the identity for the principal.

15. The system of claim 14, wherein the access control rights service traverses the directory tree from a root to a level associated with the container object to collect the access rights.

16. The system of claim 14, wherein the access control rights service accesses a partitioned sub tree for the container objected to acquire the access rights.

17. The system of claim 14, wherein the access control rights service applies filters when traversing the directory tree to create the container-level object cache.

18. The system of claim 14, wherein the container-object level cache is updated in accordance with policy.

19. The system of claim 14, wherein the container-object level cache is maintained as a table, each row of the table corresponding to a particular level in a path from a root to the container object and each column corresponding to a different type of access right.

20. A system, comprising:
a processor; and
a memory coupled with and readable by the processor and having stored therein a sequence of instructions which, when executed by the processor, cause the processor to execute an access rights cache for a plurality of container objects of a directory tree and a directory service, wherein the directory service maintains a collection of container-level rights buffers within the access rights cache, each rights buffer corresponds to access rights for a particular principal on a particular container object, wherein the directory service maintains each container-level rights buffer in triplicate including a static rights buffer, a dynamic groups rights buffer, and a nested group rights buffer, and wherein when the particular principal attempts access to a target resource or a target attribute of the target resource that is included within the particular container object, the directory service uses corresponding container-level rights buffer and its access rights along with other access rights of the target resource to calculate and to set security for the particular principal on the target resource and/or the target attribute.

21. The system of claim 20, wherein the access rights cache is maintained in memory, in storage, or in the memory and the storage.

22. The system of claim 20, wherein the directory service overrides some rights in response to rights filters.

23. The system of claim 20, wherein the access rights cache is updated in accordance with policy.

* * * * *

UNITED STATES PATENT AND TRADEMARK OFFICE
CERTIFICATE OF CORRECTION

PATENT NO.        : 8,245,291 B2
APPLICATION NO.   : 12/272981
DATED             : August 14, 2012
INVENTOR(S)       : Kumar et al.

It is certified that error appears in the above-identified patent and that said Letters Patent is hereby corrected as shown below:

On Title page, in column 2, under "Other Publications", line 1, delete "bublib" and insert -- publib --, therefor.

On Title page, in column 2, under "Other Publications", line 2, delete ".jsb" and insert -- .jsp --, therefor.

On Title page, in column 2, under "Abstract", line 4, delete "requester" and insert -- requestor --, therefor.

On Title page, in column 2, under "Abstract", line 7, delete "requester." and insert -- requestor. --, therefor.

Signed and Sealed this
Sixth Day of November, 2012

David J. Kappos
*Director of the United States Patent and Trademark Office*